United States Patent
Matsuki et al.

(10) Patent No.: US 10,174,178 B2
(45) Date of Patent: Jan. 8, 2019

(54) POLYOLEFIN RESIN FOAM SHEET AND ADHESIVE TAPE

(71) Applicant: SEKISUI CHEMICAL CO., LTD., Osaka (JP)

(72) Inventors: Shigeki Matsuki, Hikone (JP); Koji Yachi, Shiraoka (JP); Asami Matsumoto, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/514,097

(22) PCT Filed: Sep. 29, 2015

(86) PCT No.: PCT/JP2015/077599
§ 371 (c)(1),
(2) Date: Mar. 24, 2017

(87) PCT Pub. No.: WO2016/052556
PCT Pub. Date: Apr. 7, 2016

(65) Prior Publication Data
US 2017/0292002 A1    Oct. 12, 2017

(30) Foreign Application Priority Data

Sep. 30, 2014  (JP) ................. 2014-202126
Mar. 18, 2015  (JP) ................. 2015-054805

(51) Int. Cl.
| | |
|---|---|
| C08J 9/10 | (2006.01) |
| B32B 27/06 | (2006.01) |
| B32B 5/18 | (2006.01) |
| B32B 27/32 | (2006.01) |
| B32B 7/12 | (2006.01) |
| C09J 7/26 | (2018.01) |
| B29C 44/56 | (2006.01) |
| C08J 9/00 | (2006.01) |
| B29K 105/00 | (2006.01) |
| B29K 105/04 | (2006.01) |
| B29K 23/00 | (2006.01) |
| B29L 7/00 | (2006.01) |
| B29K 105/24 | (2006.01) |
| B29C 44/50 | (2006.01) |

(52) U.S. Cl.
CPC ................. *C08J 9/103* (2013.01); *B32B 5/18* (2013.01); *B32B 7/12* (2013.01); *B32B 27/065* (2013.01); *B32B 27/32* (2013.01); *C09J 7/26* (2018.01); *B29C 44/505* (2016.11); *B29C 44/5672* (2013.01); *B29K 2023/06* (2013.01); *B29K 2023/12* (2013.01); *B29K 2105/0005* (2013.01); *B29K 2105/0014* (2013.01); *B29K 2105/0061* (2013.01); *B29K 2105/041* (2013.01); *B29K 2105/046* (2013.01); *B29K 2105/24* (2013.01); *B29K 2995/0007* (2013.01); *B29K 2995/0097* (2013.01); *B29L 2007/007* (2013.01); *B32B 2405/00* (2013.01); *C08J 9/0061* (2013.01); *C08J 2201/026* (2013.01); *C08J 2201/03* (2013.01); *C08J 2203/04* (2013.01); *C08J 2205/044* (2013.01); *C08J 2207/02* (2013.01); *C08J 2323/06* (2013.01); *C08J 2423/08* (2013.01); *C09J 2201/606* (2013.01); *C09J 2400/243* (2013.01); *C09J 2423/006* (2013.01); *C09J 2423/046* (2013.01)

(58) Field of Classification Search
CPC .... C08J 9/103; C08J 2203/04; C08J 2323/06; B32B 27/32; B32B 5/18; B32B 7/12; B32B 27/065; B32B 2405/00; C09J 7/0275; C09J 2423/046
See application file for complete search history.

(56) References Cited

FOREIGN PATENT DOCUMENTS

| | | | |
|---|---|---|---|
| JP | 2009-249458 | 10/2009 | |
| JP | 2012-214800 | 11/2012 | |
| JP | 2012214800 A | * 11/2012 | ............... C08J 9/06 |
| JP | 2013-53177 | 3/2013 | |
| JP | 2013-53178 | 3/2013 | |
| JP | 2013-053179 | 3/2013 | |
| JP | 2013-147566 | 8/2013 | |
| JP | 2014-28925 | 2/2014 | |
| WO | 2013-099755 | 7/2013 | |
| WO | 2013/154137 | 10/2013 | |

OTHER PUBLICATIONS

Tateo (JP 2012-214800 A); Nov. 8, 2012, (JPP—machine translation to English).*
International Search Report dated Jan. 12, 2016 in International (PCT) Application No. PCT/JP2015/077599.
Extended European Search Report dated Apr. 6, 2018 in European Application No. 15846653.2.

* cited by examiner

*Primary Examiner* — David Sample
*Assistant Examiner* — Donald M Flores, Jr.
(74) *Attorney, Agent, or Firm* — Wenderoth, Lind & Ponack, L.L.P.

(57) ABSTRACT

There is provided a polyolefin resin foam sheet having a plurality of cells which is formed by foaming a polyolefin resin, wherein, in the polyolefin resin foam sheet, the average cell sizes and the maximum cell sizes in the MD direction and the TD direction are each a predetermined value, and a ratio [TD strength at break/MD average cell size] and a ratio [MD strength at break/TD average cell size] are both 80 kPa/µm or more.

8 Claims, No Drawings

POLYOLEFIN RESIN FOAM SHEET AND ADHESIVE TAPE

TECHNICAL FIELD

The present invention relates to a polyolefin resin foam sheet obtained by foaming a polyolefin resin, particularly to a polyolefin resin foam sheet suitable as an impact absorber and an adhesive tape using the same.

BACKGROUND ART

Since a foam sheet in which a large number of cells are formed in the inner part of a resin layer is excellent in cushioning properties, it is widely used as an impact absorber of various electric equipment. Such an impact absorber is arranged and used between a glass plate and an image display member which constitute a device surface in a display device used, for example, for a mobile phone, a personal computer, electronic paper, and the like. A polyolefin resin is known as a resin foam sheet used for such applications (for example, refer to Patent Literatures 1 and 2).

CITATION LIST

Patent Literature

PTL1: JP 2014-028925 A
PTL2: WO 2013/099755

SUMMARY OF INVENTION

Technical Problem

Incidentally, with the miniaturization of electronic equipment in recent years, a resin foam sheet used in electronic equipment applications has also been reduced in thickness and width. Thus, it is required that even a thin and narrow resin foam sheet have high impact-absorbing properties and impact resistance. In order to improve the impact-absorbing properties and impact resistance of a resin foam material, it is expected, for example, to improve flexibility by increasing the expansion ratio and to increase rigidity by increasing the degree of crosslinking. However, a thin resin foam sheet cannot obtain sufficient impact-absorbing properties and impact resistance by simply adjusting the expansion ratio and the degree of crosslinking, and further improvement is desired.

Further, since a touch-sensitive display device is often used in the electronic equipment described above, defects are liable to be generated by the influence of static electricity; for example, the display device will not light up. Therefore, it is also required that a foam sheet have withstand voltage properties.

The present invention has been made in view of the above conventional circumstances, and an object of the present invention is to provide a thin polyolefin resin foam sheet which is excellent in impact-absorbing properties and impact resistance and has withstand voltage properties, and an adhesive tape using the same.

Solution to Problem

As a result of extensive and intensive studies, the present inventors have found that a polyolefin resin foam sheet in which impact-absorbing properties are maintained in a satisfactory state and which is excellent in withstand voltage properties can be obtained by suppressing the expansion ratio at a low level and adjusting the average cell sizes and the strengths at break in the MD direction and the TD direction of the polyolefin resin foam sheet in a predetermined range, and have completed the present invention.

Specifically, the following [1] and [2] are the gist of the present invention.

[1] A polyolefin resin foam sheet having a plurality of cells which is formed by foaming a polyolefin resin, wherein, in the polyolefin resin foam sheet, the average cell sizes in the MD direction and the TD direction are 150 μm or less, and the maximum cell sizes in the MD direction and the TD direction are 500 μm or less; and a ratio of strength at break in the TD direction to the average cell size in the MD direction, [TD strength at break/MD average cell size], and a ratio of strength at break in the MD direction to the average cell size in the TD direction, [MD strength at break/TD average cell size], are both 80 kPa/μm or more.

[2] An adhesive tape having a pressure sensitive adhesive layer provided on at least one surface of the polyolefin resin foam sheet according to the above [1].

Advantageous Effects of Invention

The present invention can provide a thin polyolefin resin foam sheet which is excellent in impact-absorbing properties and impact resistance and has withstand voltage properties, and an adhesive tape using the same.

DESCRIPTION OF EMBODIMENTS

[Polyolefin Resin Foam Sheet]

The polyolefin resin foam sheet (hereinafter, also referred to as the "foam sheet") of the present invention is a sheet obtained by foaming a polyolefin resin, and it has a large number of cells.

Hereinafter, the polyolefin resin foam sheet of the present invention will be described further in detail.

<Average Cell Size and Maximum Cell Size>

In the foam sheet of the present invention, the average cell sizes in the MD direction and the TD direction are 150 μm or less, and the maximum cell sizes in the MD direction and the TD direction are 500 μm or less. If the average cell sizes and maximum cell sizes are outside the above ranges, withstand voltage properties cannot sufficiently be secured, and impact resistance will also be reduced.

From such a point of view, the average cell sizes in the MD direction and the TD direction in the foam sheet of the present invention are both preferably 20 μm or more, more preferably 25 μm or more, further preferably 30 μm or more; and preferably 120 μm or less, more preferably 100 μm or less, and further preferably 80 μm or less; specifically, both preferably 20 to 120 μm, more preferably 25 to 100 μm, and further preferably 30 to 80 μm.

Further, the average cell size in the ZD direction in the foam sheet of the present invention is preferably 5 μm or more, more preferably 7 μm or more, further preferably 8 μm or more, and further more preferably 10 μm or more; and preferably 80 μm or less, more preferably 50 μm or less, further preferably 40 μm or less, and further more preferably 30 μm or less; specifically, preferably 5 to 80 μm, more preferably 7 to 50 μm, further preferably 8 to 40 μm, and further more preferably 10 to 30 μm, in view of securing withstand voltage properties and impact resistance.

Further, the maximum cell sizes in the MD direction and the TD direction in the foam sheet of the present invention are both preferably 60 µm or more, more preferably 70 µm or more, and further preferably 80 µm or more; and preferably 400 µm or less, more preferably 300 µm or less, and further preferably 200 µm or less; specifically, both preferably 60 to 400 µm, more preferably 70 to 300 µm, and further preferably 80 to 200 µm, in view of sufficiently securing withstand voltage properties and impact resistance.

Furthermore, the maximum cell size in the ZD direction in the foam sheet of the present invention is preferably 5 µm or more, more preferably 8 µm or more, further preferably 10 µm or more, and further more preferably 12 µm or more; and preferably 150 µm or less, more preferably 120 µm or less, further preferably 95 µm or less, further more preferably 80 µm or less, further more preferably 70 µm or less, further more preferably 60 µm or less, further more preferably 50 µm or less, further more preferably 40 µm or less, and further more preferably 30 µm or less; specifically, preferably 5 to 150 µm, more preferably 8 to 120 µm, further preferably 10 to 95 µm, and further more preferably 12 to 80 µm, in view of securing withstand voltage properties and impact resistance.

Note that, in the present invention, "MD" means Machine Direction, and it means a direction that is in agreement with the direction of extrusion or the like of a polyolefin resin foam sheet. Further, "TD" means Transverse Direction, and it means a direction that is orthogonal to MD and parallel to the foam sheet. Further, "ZD" means Thickness Direction and is a direction perpendicular to both MD and TD.

The average cell size and the maximum cell size can be measured in accordance with the method in Examples to be described below.

<Ratios of Average Cell Size and Maximum Cell Size>

In the foam sheet of the present invention, the ratio of the average cell size in the MD direction to that in the TD direction, [MD average cell size/TD average cell size], is preferably 0.6 to 1.4. When the ratio [MD average cell size/TD average cell size] is within the above range, the difference in physical properties in the MD direction and the TD direction will be small.

From such a point of view, the ratio [MD average cell size/TD average cell size] is more preferably 0.7 or more, further preferably 0.8 or more; and more preferably 1.3 or less, further preferably 1.2 or less; specifically, more preferably 0.7 to 1.3, further preferably 0.8 to 1.2.

Further, in the foam sheet of the present invention, the ratio of the maximum cell size in the MD direction to that in the TD direction, [MD maximum cell size/TD maximum cell size], is preferably 0.6 or more, more preferably 0.7 or more; and preferably 1.4 or less, more preferably 1.3 or less; specifically, preferably 0.6 to 1.4, more preferably 0.7 to 1.3. When the ratio [MD maximum cell size/TD maximum cell size] is within the above ranges, a foam sheet having a good balance in physical properties in the MD direction and the TD direction can be obtained.

<Ratio of Strength at Break to Average Cell Size>

In the foam sheet of the present invention, a ratio of strength at break in the TD direction to the average cell size in the MD direction, [TD strength at break/MD average cell size], and a ratio of strength at break in the MD direction to the average cell size in the TD direction, [MD strength at break/TD average cell size], are both 80 kPa/µm or more, preferably 90 kPa/µm or more, more preferably 95 kPa/µm or more, further preferably 100 kPa/µm or more, further more preferably 150 kPa/µm or more, further more preferably 200 kPa/µm or more, further more preferably 250 kPa/µm or more, further more preferably 300 kPa/µm or more, and further more preferably 350 kPa/µm or more; and preferably 800 kPa/µm or less, more preferably 700 kPa/µm or less, further preferably 600 kPa/µm or less, further more preferably 550 kPa/µm or less, and further more preferably 500 kPa/µm or less; and specifically, preferably 90 to 800 kPa/µm, more preferably 95 to 700 kPa/µm, and further preferably 100 to 600 kPa/µm. When the ratio is within the above ranges, a polyolefin foam sheet excellent in the balance between the impact-absorbing properties and impact resistance and the withstand voltage properties will be obtained.

<Expansion Ratio>

In the present invention, the expansion ratio of a foam sheet is preferably 1.1 to 2.8 cm$^3$/g. When the expansion ratio is within the above range, the impact-absorbing properties and sealing properties of the foam sheet will be easily and sufficiently secured. Further, when the expansion ratio is 2.8 cm$^3$/g or less, the resin density will be increased, and the withstand voltage properties can sufficiently be secured.

In view of improving the withstand voltage properties, impact-absorbing properties, and sealing properties, the expansion ratio of a foam sheet is more preferably 1.5 to 2.6 cm$^3$/g, further preferably 1.6 to 2.5 cm$^3$/g.

<Gel Fraction (Degree of Crosslinking)>

The foam sheet of the present invention is preferably crosslinked in view of improving impact resistance and impact-absorbing properties; and when the foam sheet is crosslinked, the gel fraction (degree of crosslinking) is preferably 5 to 60% by mass. When the gel fraction (degree of crosslinking) is equal to or more than the above lower limit, sufficient crosslinking will be formed in the foam sheet, thus capable of improving both impact-absorbing properties and impact resistance. Further, when the gel fraction (degree of crosslinking) is equal to or less than the above upper limit, the flexibility of the foam sheet will be easily secured. From such a point of view, the gel fraction (degree of crosslinking) is more preferably 15 to 55% by mass, further preferably 20 to 55% by mass, and further more preferably 25 to 55% by mass.

Note that the gel fraction (degree of crosslinking) can be represented by the gel fraction measured by the measuring method to be described below.

<Withstand Voltage Value>

The withstand voltage value of the foam sheet of the present invention at a width of 0.7 mm is preferably 8 kV/0.7 mm or more. When the withstand voltage value is equal to or more than the above lower limit, the withstand voltage properties will be easily secured. From such a point of view, the withstand voltage value is more preferably 9 kV/0.7 mm or more, further preferably 10 kV/0.7 mm or more.

In view of securing withstand voltage properties, the withstand voltage value of the foam sheet of the present invention at a width of 1.0 mm is preferably 9 kV/1.0 mm or more, more preferably 10 kV/1.0 mm or more, and further preferably 11 kV/1.0 mm or more.

Note that the withstand voltage value can be measured by the measuring method in Examples to be described below.

<Thickness>

The thickness of the foam sheet of the present invention is preferably 0.02 to 1.9 mm, more preferably 0.03 to 1.0 mm, further preferably 0.04 to 0.50 mm, and further more preferably 0.05 to 0.30 mm, in view of improving impact-absorbing properties and withstand voltage properties even if the foam sheet is thin. When the thickness of the foam sheet is within the above ranges, imp act-absorbing properties, sealing properties, and withstand voltage properties will be improved.

<25% Compressive Strength>

The 25% compressive strength of the foam sheet is, but not limited to, preferably 100 to 2,000 kPa, more preferably 150 to 1,800 kPa, further preferably 150 to 1,600 kPa, further more preferably 150 to 1,400 kPa, further more preferably 150 to 1,200 kPa, further more preferably 150 to 1,000 kPa, and further more preferably 150 to 800 kPa. When the 25% compressive strength is equal to or less than the above upper limits, the flexibility of the foam sheet will be improved; and when the foam sheet is used for forming an adhesive tape, the followability to an adherend will be improved. This is advantageous in that neither water nor air can easily enter the inner part of electronic equipment. Further, when the 25% compressive strength is equal to or more than the above lower limits, both impact-absorbing properties and impact resistance will be improved.

Note that the 25% compressive strength can be measured in accordance with the method described in Examples to be described below.

<Interlaminar Strength>

When a pressure sensitive adhesive layer or an adhesive layer is provided on at least one surface of the foam sheet of the present invention, the interlaminar strength between the foam sheet and the pressure sensitive adhesive layer or the adhesive layer is, but not particularly limited to, preferably 1 to 10 MPa, more preferably 2 to 9 MPa. When the interlaminar strength between the foam sheet and the pressure sensitive adhesive layer or the adhesive layer is equal to or more than the above lower limits, the impact resistance of the foam sheet will be improved. This is advantageous in that when the foam sheet is formed into an adhesive tape, the foam sheet will be hardly peeled in the inner part of electronic equipment. Further, when the interlaminar strength is equal to or less than the above upper limits, the impact-absorbing properties will be improved. This is advantageous in that when the foam sheet is formed into an adhesive tape, the foam sheet will be hardly peeled from the pressure sensitive adhesive layer or the adhesive layer at the interface thereof in the inner part of electronic equipment.

Note that the interlaminar strength can be measured in accordance with the method described in Examples to be described below.

<Ratio of Interlaminar Strength to Thickness of Foam Sheet>

The ratio of the interlaminar strength to the thickness of the foam sheet of the present invention, [interlaminar strength/thickness], is, but not particularly limited to, preferably 20 to 80 MPa/mm, more preferably 30 to 80 MPa/mm. When the ratio is equal to or more than the above lower limits, the impact resistance of the foam sheet can be maintained even if the thickness of the foam sheet is about 0.02 mm. Further, when the ratio is equal to or less than the above upper limits, the impact-absorbing properties will be improved.

Since conventional foam sheets have tended to have a lower interlaminar strength as the thickness is reduced, it has been difficult to increase the ratio. However, as a result of extensive and intensive studies by the present inventors, it is possible to increase the ratio by adjusting the cell sizes and the like within the ranges described above.

<Percentage of Closed Cells>

In the foam sheet, the cells are preferably closed cells. "The cells being closed cells" means that the proportion of closed cells relative to all the cells (referred to as "percentage of closed cells") is 70% or more. When an impact is applied to cells, the deformation amount of the cells will be suppressed when the cells are closed cells. Thereby, the deformation amount of the foam sheet by the impact will be suppressed to thereby more easily increase impact-absorbing properties.

In order to improve impact-absorbing properties, the percentage of closed cells is preferably 75% or more, more preferably 90% or more.

Note that the percentage of closed cells refers to that as measured according to ASTM D2856 (1998).

[Polyolefin Resin]

Examples of the polyolefin resins used for forming a foam sheet include a polyethylene resin, a polypropylene resin, and mixtures thereof, and a polyethylene resin is preferred among these resins. More specific examples include a polyethylene resin, a polypropylene resin, and mixtures thereof polymerized with a polymerization catalyst such as a Ziegler-Natta compound, a metallocene compound, and a chromium oxide compound, and a polyethylene resin polymerized with a metallocene polymerization catalyst is preferred among these resins.

The polyethylene resin may be an ethylene homopolymer, but a polyethylene resin obtained by optionally copolymerizing an ethylene and a small amount (for example, 30% by mass or less, preferably 10% by mass or less, of total monomers) of α-olefin is preferred, and a linear low density polyethylene is preferred among these resins.

A foam sheet having high flexibility and high impact-absorbing properties can be easily obtained by using a polyethylene resin, particularly a linear low density polyethylene, obtained by using a metallocene polymerization catalyst.

Specific examples of α-olefins constituting the polyethylene resin include propylene, 1-butene, 1-pentene, 4-methyl-1-pentene, 1-hexene, 1-heptene, and 1-octene. Among them, α-olefins having 4 to 10 carbon atoms are preferred.

Further, an ethylene-vinylacetate copolymer is also preferably used as a polyethylene resin. The ethylene-vinylacetate copolymer is generally a copolymer containing 50% by mass or more of ethylene units.

The polyethylene resin, ethylene-vinylacetate copolymer, or mixtures thereof obtained by using the metallocene polymerization catalyst is preferably contained in the foam sheet in an amount of 40% by mass or more, more preferably 50% by mass or more, further preferably 60% by mass or more, and most preferably 100% by mass, of the total polyolefin resins.

Further, examples of the polypropylene resin include a propylene homopolymer and a propylene-α-olefin copolymer containing 50% by mass or more of propylene units. These may be used singly or in combination of two or more.

Specific examples of α-olefins constituting the propylene-α-olefin copolymer include ethylene, 1-butene, 1-pentene, 4-methyl-1-pentene, 1-hexene, 1-heptene, and 1-octene, and α-olefins having 6 to 12 carbon atoms are preferred among them.

[Metallocene Compound]

Examples of the metallocene compounds suitable include a compound such as a bis(cyclopentadienyl)metal complex having a structure in which a transition metal is sandwiched by unsaturated compounds each having a π-electron system. More specific examples include a compound in which one or more cyclopentadienyl rings or analogs thereof are present as ligands on a tetravalent transition metal such as titanium, zirconium, nickel, palladium, hafnium, and platinum.

In such a metallocene compound, active sites have uniform properties, and each active site has the same degree of activity. A polymer synthesized using a metallocene compound has high uniformity in molecular weight, molecular weight distribution, composition, composition distribution, and the like. Therefore, when a sheet containing a polymer synthesized using a metallocene compound is crosslinked, the crosslinking proceeds uniformly. Since a uniformly crosslinked sheet is easily uniformly stretched, the thickness of the crosslinked polyolefin resin foam sheet can be easily made uniform.

Examples of the ligands include a cyclopentadienyl ring and an indenyl ring. These cyclic compounds may be substituted with a hydrocarbon group, a substituted hydrocarbon group, or a hydrocarbon-substituted metalloid group. Examples of the hydrocarbon group include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. Note that "various" means various isomers including n-, sec-, tert-, and iso-.

Further, an oligomer obtained by polymerizing a cyclic compound may be used as a ligand.

Furthermore, a monovalent anion ligand such as chloride and bromide, a bivalent anion chelate ligand, hydrocarbon, alkoxide, arylamide, aryloxide, amide, arylamide, phosphide, arylphosphide, and the like may be used in addition to the unsaturated compounds each having a π-electron system.

Examples of the metallocene compound containing a tetravalent transition metal and a ligand include cyclopentadienyltitanium tris(dimethylamide), methylcyclopentadienyltitanium tris(dimethylamide), bis(cyclopentadienyl)titanium dichloride, and dimethylsilyltetramethylcyclopentadienyl-t-butylamidezirconium dichloride.

A metallocene compound exhibits the action as a catalyst by using it in combination with a specific cocatalyst (promoter) when various olefins are polymerized. Specific examples of the cocatalyst include methyl aluminoxane (MAO) and a boron-based compound. Note that the ratio of the molar amount of the cocatalyst to be used relative to that of the metallocene compound is preferably 10 to 1,000,000, more preferably 50 to 5,000.

<Ziegler-Natta Compound>

The Ziegler-Natta compound is a triethylaluminum-titanium tetrachloride solid composite, and is preferably produced by a method including producing a titanium trichloride composition by reducing titanium tetrachloride with an organoaluminum compound and treating with various electron donors and electron acceptors, and then combining the titanium trichloride composition, an organoaluminum compound, and an aromatic carboxylate (refer to JP 56-100806 A, JP 56-120712 A, and JP 58-104907 A), a method involving using a supported catalyst in which titanium tetrachloride and various electron donors are brought into contact with a magnesium halide (refer to JP 57-63310 A, JP 63-43915 A, and JP 63-83116 A), or the like.

In order to increase the flexibility of a foam sheet to increase the impact-absorbing resistance thereof, the polyethylene resin preferably has a low density. Specifically, the density of the polyethylene resin is preferably 0.920 g/cm$^3$ or less, more preferably 0.880 to 0.915 g/cm$^3$, and particularly preferably 0.885 to 0.910 g/cm$^3$.

Note that the density is measured according to ASTM D792.

A resin other than the above-described polyolefin resins can also be used as a polyolefin resin, and a resin other than a polyethylene resin and a polypropylene resin may be further mixed and used with the polyethylene resin and the polypropylene resin.

Further, various additives and other optional components to be described below may be mixed with the polyolefin resin, and a foam sheet may comprise a mixture which has been crosslinked and foamed.

Examples of the optional components contained in a foam sheet include a resin and a rubber other than the polyolefin resin. The total content of the resin and rubber is less than the content of the polyolefin resin, and is generally 50 parts by mass or less, preferably 30 parts by mass or less, based on 100 parts by mass of the polyolefin resin.

Note that the foaming of the polyolefin resin is preferably performed using a blowing agent of heat decomposition type as will be described below, but the resin may be foamed by other methods. Further, the crosslinking of the polyolefin resin is preferably performed by irradiation with ionizing radiation to be described below, but the crosslinking may be performed by other methods.

[Method for Producing Foam Sheet]

The foam sheet of the present invention can be produced by foaming a polyolefin resin by a common method. The method for producing the polyolefin resin foam sheet is not limited, and the foam sheet can also be produced by crosslinking the polyolefin resin composition as needed followed by foaming.

Specifically, the foam sheet of the present invention can be produced, for example, by a method comprising the following steps (1) to (3);

Step (1); A step of obtaining a sheet-shaped polyolefin resin composition by feeding a polyolefin resin, a blowing agent of heat decomposition type, and other additives to an extruder, melt-kneading these components, and extruding the melt-kneaded mixture from the extruder into a sheet shape;

Step (2): A step of crosslinking the sheet-shaped polyolefin resin composition; and Step (3): A step of heating the sheet-shaped crosslinked polyolefin resin composition to foam the blowing agent of heat decomposition type and stretching the sheet preferably either in the MD direction or in the TD direction, or in both directions.

Note that, instead of the method described above, the crosslinked polyolefin resin foam sheet can also be produced by a method described in WO 2005/007731.

Examples of the blowing agent of heat decomposition type include, but are not particularly limited to, azodicarbonamide, N,N'-dinitrosopentamethylenetetramine, and p-toluenesulfonyl semicarbazide. Among them, azodicarbonamide is preferred. Note that the blowing agents of heat decomposition type may be used singly or in combination of two or more.

The content of the blowing agent of heat decomposition type in the polyolefin resin composition is preferably 1 to 12 parts by mass, more preferably 1 to 8 parts by mass, based on 100 parts by mass of a polyolefin resin. When the content of the blowing agent of heat decomposition type is within the above ranges, the foamability of the polyolefin resin composition will be improved; a polyolefin resin foam sheet having a desired expansion ratio will be easily obtained; and tensile strength and compression recovery properties will be improved.

Examples of other additives used in the step (1) include a decomposition temperature regulator, a crosslinking auxiliary, and an antioxidant.

The decomposition temperature regulator is blended for reducing the decomposition temperature of the blowing agent of heat decomposition type or increasing or controlling the decomposition rate, and examples of specific compounds thereof include zinc oxide, zinc stearate, and urea. The decomposition temperature regulator is blended, for example, in an amount of 0.01 to 5 parts by mass based on 100 parts by mass of the polyolefin resin, in order to adjust the surface state or the like of the foam sheet.

A polyfunctional monomer can be used as a crosslinking auxiliary. Addition of the crosslinking auxiliary to the polyolefin resin reduces the dose of ionizing radiation radiated in step (2) to be described below to thereby prevent the cutting and degradation of resin molecules accompanying the irradiation with the ionizing radiation.

Specific examples of the crosslinking auxiliary include compounds having three functional groups in one molecule, such as trimethylolpropane trimethacrylate, trimethylolpropane triacrylate, triallyl trimellitate ester, triallyl 1,2,4-benzenetricarboxylate ester, and triallyl isocyanurate; compounds having two functional groups in one molecule, such as 1,6-hexanediol dimethacrylate, 1,9-nonanediol dimethacrylate, 1,10-decanediol dimethacrylate, and divinylbenzene; diallyl phthalate, diallyl terephthalate, diallyl isophthalate, ethylvinylbenzene, neopentyl glycol dimethacrylate, lauryl methacrylate, and stearyl methacrylate.

These crosslinking auxiliaries are used singly or in combination of two or more.

The amount of the crosslinking auxiliary added is preferably 0.2 to 10 parts by mass, more preferably 0.3 to 5 parts by mass, further preferably 0.5 to 5 parts by mass, based on 100 parts by mass of the resin components. When the amount of the crosslinking auxiliary added is 0.2 parts by mass or more, the foam sheet can stably obtain a desired degree of crosslinking, and when the amount of the crosslinking auxiliary added is 10 parts by mass or less, the control of the degree of crosslinking of the foam sheet will be easy.

Further, examples of the antioxidant include phenolic antioxidants, such as 2,6-di-t-butyl-p-cresol.

Examples of the methods of foaming the polyolefin resin composition include, but are not particularly limited to, a method including heating the polyolefin resin composition with hot air, a method including heating it with infrared rays, a method including heating it with a salt bath, and a method including heating it with an oil bath. These methods may be used in combination.

Note that the foaming of the polyolefin resin composition is not limited to the case of using a blowing agent of heat decomposition type, and physical expansion with butane gas or the like may be used.

Examples of the method for crosslinking the polyolefin resin composition include a method including irradiating the polyolefin resin composition with ionizing radiation, such as electron beams, $\alpha$-rays, $\beta$-rays, and $\gamma$-rays, and a method including blending an organic peroxide with the polyolefin resin composition in advance and heating the polyolefin resin composition to decompose the organic peroxide. These methods may be used in combination. Among them, the method including irradiating the resin composition with ionizing radiation is preferred.

The dose of ionizing radiation is preferably 0.5 to 20 Mrad, more preferably 3 to 12 Mrad so that the gel fraction may be 5 to 60% by mass.

Examples of the organic peroxide used for crosslinking include 1,1-bis(t-butylperoxy)3,3,5-trimethylcyclohexane and 1,1-bis(t-butylperoxy)cyclohexane. These may be used singly or in combination of two or more. The amount of the organic peroxide added is preferably 0.01 to 5 parts by mass, more preferably 0.1 to 3 parts by mass, based on 100 parts by mass of the polyolefin resin. When the amount of the organic peroxide added is within the above ranges, the crosslinking of the polyolefin resin composition will easily proceed, and the amount of the decomposed residue of the organic peroxide in the resulting crosslinked polyolefin resin foam sheet will be suppressed.

The polyolefin resin foam sheet of the present invention is preferably stretched, as described above. The stretching may be performed after the polyolefin resin composition is foamed to obtain a foam sheet, or may be performed while foaming the polyolefin resin composition. Note that when a foam sheet is stretched after the polyolefin resin composition is foamed to obtain a foam sheet, the foam sheet is preferably stretched without break while maintaining the molten state during the foaming without cooling the foam sheet, but a foam sheet may also be stretched after the foam sheet is cooled and then heated again to a melted or a softened state.

Further, the stretching ratio in the MD direction of the polyolefin resin foam sheet is preferably 1.1 to 3.0, more preferably 1.3 to 2.8. When the stretching ratio in the MD direction of the polyolefin resin foam sheet is set to the above lower limits or more, the flexibility and tensile strength of the polyolefin resin foam sheet will be easily improved. On the other hand, when the stretching ratio in the MD direction of the polyolefin resin foam sheet is set to the above upper limits or less, the foam sheet will be prevented from breaking during stretching; the reduction of expansion ratio by the escape of blowing gas from the foam sheet during foaming will be prevented; the flexibility and tensile strength of the polyolefin resin foam sheet will be improved; and the quality will also be easily uniform. Further, the polyolefin resin foam sheet may also be stretched in the TD direction at a stretching ratio within the above ranges.

[Adhesive Tape]

The adhesive tape of the present invention comprises a foam sheet according to the present invention as a base material and a pressure sensitive adhesive layer provided on one surface or both surfaces of the foam sheet. The adhesive tape has a thickness of generally 0.03 to 2.0 mm, preferably 0.05 to 1.0 mm.

The pressure sensitive adhesive layer constituting the adhesive tape preferably has a thickness of 5 to 200 μm, more preferably 7 to 150 μm, further preferably 10 to 100 μm. When the pressure sensitive adhesive layer constituting the adhesive tape has a thickness of 5 to 200 μm, the thickness of the adhesive tape can be reduced, and the reduced thickness of the adhesive tape can contribute to the miniaturization and reduction in thickness of electronic equipment itself in which the adhesive tape is used.

Examples of the pressure sensitive adhesive constituting the pressure sensitive adhesive layer provided on one surface or both surfaces of the foam sheet include, but are not particularly limited to, an acrylic pressure sensitive adhesive, a urethane pressure sensitive adhesive, and a rubber pressure sensitive adhesive.

Examples of the method of applying a pressure sensitive adhesive to a foam sheet so as to laminate a pressure sensitive adhesive layer to the foam sheet include a method including applying a pressure sensitive adhesive to at least one surface of a foam sheet using a coating machine such as a coater, a method including spraying/applying a pressure sensitive adhesive to at least one surface of a foam sheet using a sprayer, and a method including applying a pressure sensitive adhesive to one surface of a foam sheet using a brush.

The adhesive tape using the foam sheet of the present invention can be used as an impact absorber which prevents an impact from being applied to the electronic components built in the body of electronic equipment, such as a mobile phone and a video camera, and as a sealing material which prevents dust, water, and the like from entering the body of electronic equipment.

EXAMPLES

The present invention will be described further in detail with Examples, but the present invention is not limited at all by these Examples.

[Measuring Methods]

The measuring method of each physical property in the present specification is as follows.

<Density and Expansion Ratio>

The density of the polyolefin resin foam sheet was measured according to JIS K7222, and the reciprocal thereof was defined as the expansion ratio.

<Gel Fraction (Degree of Crosslinking)>

A test piece weighing about 50 mg is taken from a polyolefin resin foam sheet and precisely weighed to obtain the weight A (mg) of the test piece. Next, the test piece is immersed in 30 cm$^3$ of xylene at 105° C., allowed to stand for 24 hours, and then filtered through a 200-mesh wire net to collect insoluble matter on the wire net. The insoluble matter is vacuum dried and precisely weighed to obtain the weight B (mg) of the insoluble matter. From the obtained values, the degree of crosslinking (% by mass) is calculated by the following formula.

Gel fraction(% by mass)=$(B/A)\times 100$

<Average Cell Sizes and Maximum Cell Sizes in the MD Direction, the TD Direction, and the ZD Direction>

The foam sheets obtained in Examples and Comparative Examples were each cut into a 50-mm square, which was provided as a foam sample for measurement. The foam sample was immersed in liquid nitrogen for 1 minute and then cut with a razor in the thickness direction along the MD direction, the TD direction, and the ZD direction, respectively. A photograph of the section at a magnification of 200 was taken using a digital microscope ("VHX-900" manufactured by Keyence Corporation) and measured for the cell sizes of all the closed cells present in the cut surface for a length of 2 mm in each of the MD direction, the TD direction, and the ZD direction. The operation was repeated 5 times, and the average value of all the cell sizes was defined as the average cell size in the MD direction, the TD direction, and the ZD direction.

Further, in the measured cell sizes, the largest cell size was defined as the maximum cell size.

<Strengths at Break in MD Direction and TD Direction>

A polyolefin resin foam sheet was cut into a shape of the dumbbell No. 1 specified in JIS K6251 4.1. This was used as a sample and measured for the strengths at break in the MD direction and the TD direction at a measurement temperature of 23° C. according to JIS K6767.

<Interlaminar Strength>

A primer ("PPX primer" manufactured by Cemedine Co., Ltd.) was applied to a 25-mm square area of a foam sheet, and then an adhesive ("PPX" manufactured by Cemedine Co., Ltd.) was dropped on the center of the application portion in an amount corresponding to a diameter of the drop of 5 mm. Immediately after this, an aluminum jig A of a 25-mm square was placed on the portion where the adhesive was dropped, and the foam sheet and the jig A were adhered by applying pressure. Subsequently, the foam sheet was cut along the size of the jig A. The primer was applied to the surface of the cut foam sheet where the jig A was not adhered, and the adhesive was dropped on the center of the application portion in an amount corresponding to a diameter of the drop of 5 mm. Immediately after this, an aluminum jig B of a 10-mm square was placed on the portion where the adhesive was dropped, and the foam sheet and the jig B were adhered by applying pressure. After the adhesive squeezed out around the jig B was wiped off, the foam sheet was cut along the size of the jig B. The resulting laminate was allowed to stand for 30 minutes at room temperature to cure the adhesive, obtaining a sample for measuring interlaminar strength.

Subsequently, the sample for measuring interlaminar strength was attached to a testing machine ("TENSILON Universal Testing Machine" manufactured by A&D Company, Limited) equipped with a load cell of 1 kN so that the sheet surface of the foam sheet might be perpendicular to the tensile direction. One of the jigs was pulled perpendicularly upward at a rate of 100 mm/min to delaminate only the area of a 1-cm square of the foam sheet. The load at this time was measured, and the maximum value was defined as the interlaminar strength.

<25% Compressive Strength>

The 25% compressive strength refers to that obtained by measuring a polyolefin resin foam sheet according to JIS K6767.

<Withstand Voltage Value>

The withstand voltage value at a width of 0.7 mm was measured in accordance with the following method.

A tape-shaped polyolefin resin foam sheet having a width of 0.7 mm and a length of 100 mm was sandwiched in the thickness direction between two acrylic sheets and sandwiched in the width direction between two aluminum sheets arranged between the acrylic sheets. A direct-current voltage was applied to the foam sheet in the width direction using "TOS501" (maximum voltage: 12 kV) manufactured by Kikusui Electronics Corporation as a withstand voltage tester under the conditions of 23° C. and 50% RH, and when no current flow was observed for 30 seconds at the voltage, the applied voltage was increased by a 0.5-kV unit. The voltage at which current flows through the foam sheet was measured, and the voltage value was defined as the voltage value of withstand voltage properties. Note that, in this measurement, a current of 0.1 mA or less was regarded as no current flow; the measurement was performed by using both the MD direction and the TD direction of the foam sheet as the width direction of the tape; and the results of the measurement were determined in accordance with the following evaluation criteria.

(Evaluation Criteria)

When the measured values in the MD direction and the TD direction were both 10 kV or more, such a foam sheet was rated as "1", noting that the withstand voltage performance was good.

When any one of the measured values in the MD direction and the TD direction was less than 10 kV and both of the measured values in the MD direction and the TD direction were 8 kV or more, such a foam sheet was rated as "2", noting that the withstand voltage performance was practically usable.

When any one of the measured values in the MD direction and the TD direction was less than 8 kV, such a foam sheet was rated as "3", noting that the withstand voltage performance was not good.

The withstand voltage value at a width of 1.0 mm was measured in the same manner as in the case of the withstand voltage value at a width of 0.7 mm except that a tape-shaped polyolefin resin foam sheet having a width of 1.0 mm and a length of 100 mm was used.

Example 1

One hundred parts by mass of a linear low density polyethylene (polyolefin resin A: "Exact 3027" manufactured by Exxon Chemical Company, density: 0.900 g/cm³) as a polyolefin resin, 4.5 parts by mass of azodicarbonamide as a blowing agent of heat decomposition type, 1 part by mass of zinc oxide as a decomposition temperature regulator, and 0.5 part by mass of 2,6-di-t-butyl-p-cresol as an antioxidant were fed to an extruder, melt-kneaded at 130° C., and extruded as a continuous sheet of a foam composition having a thickness of about 0.3 mm.

Next, the both surfaces of the above continuous sheet of the foam composition were irradiated with 4.5 Mrad of electron beams at an acceleration voltage of 500 kV to crosslink the foam composition. Then, the resulting sheet of the crosslinked foam composition was continuously sent into a blowing oven maintained at 250° C. with hot wind and an infrared heater to be heated and foamed. While foaming the sheet of the crosslinked foam composition, the sheet was stretched at an MD stretching ratio of 1.4 and a TD stretching ratio of 1.8 to thereby obtain a foam sheet having a thickness of 0.06 mm. The evaluation results of the resulting foam sheets are shown in Table 1.

Examples 2 to 6 and Comparative Examples 1 to 4

Examples 2 to 6 and Comparative Examples 1 to 4 were performed in the same manner as in Example 1 except that the formulation of the polyolefin resin compositions was changed as shown in Tables 1 and 2; the dose at the time of crosslinking was adjusted so that gel fractions (degree of crosslinking) in Tables 1 and 2 might be obtained; and the TD stretching ratio was adjusted to 1.4 to 2.0.

Example 7 and Comparative Example 5

Example 7 and Comparative Example 5 were performed in the same manner as in Example 1 except that 70 parts by mass of an ethylene-vinylacetate copolymer resin (polyolefin resin B: "Novatec EVA" manufactured by Mitsubishi Chemical Corporation) as a polyolefin resin and 30 parts by mass of a linear low density polyethylene (polyolefin resin C: "EVAFLEX 460-H" manufactured by Prime Polymer Co., Ltd.) as a polyolefin resin were used; other components were used according to the formulation in Tables 1 and 2; the dose at the time of crosslinking was adjusted so that gel fractions (degree of crosslinking) in Tables 1 and 2 might be obtained; and the TD stretching ratio was adjusted to 1.4 to 2.0.

TABLE 1

| | | | Example | | | | | | |
|---|---|---|---|---|---|---|---|---|---|
| | | | 1 | 2 | 3 | 4 | 5 | 6 | 7 |
| Composition | Polyolefin resin A [parts by mass] | | 100 | 100 | 100 | 100 | 100 | 100 | 0 |
| | Polyolefin resin B [parts by mass] | | 0 | 0 | 0 | 0 | 0 | 0 | 70 |
| | Polyolefin resin C [parts by mass] | | 0 | 0 | 0 | 0 | 0 | 0 | 30 |
| | Additives [parts by mass] | Blowing agent of heat decomposition type | 4.5 | 4.5 | 3 | 3 | 1.6 | 1.4 | 1.9 |
| | | Decomposition temperature regulator | 1 | 1 | 1 | 1 | 1 | 1 | 1 |
| | | Antioxidant | 0.5 | 0.5 | 0.5 | 0.5 | 0.5 | 0.5 | 0.5 |
| Physical properties of foam sheet | Thickness [mm] | | 0.06 | 0.08 | 0.15 | 0.18 | 0.14 | 0.19 | 0.30 |
| | Expansion ratio [cm³/g] | | 1.5 | 1.4 | 1.8 | 1.8 | 1.3 | 1.9 | 1.9 |
| | Density [g/cm³] | | 0.67 | 0.71 | 0.56 | 0.56 | 0.77 | 0.53 | 0.53 |
| | Degree of crosslinking (gel fraction) [% by mass] | | 54.1 | 54.8 | 54.1 | 50.0 | 50.3 | 17.3 | 56.0 |
| | Average cell size [μm] | MD | 39 | 45 | 51 | 60 | 40 | 110 | 71 |
| | | TD | 63 | 53 | 64 | 61 | 65 | 135 | 50 |
| | | ZD | 10 | 13 | 22 | 28 | 21 | 40 | 32 |
| | | MD/TD | 0.62 | 0.85 | 0.80 | 0.98 | 0.62 | 0.81 | 1.42 |
| | Maximum cell size [μm] | MD | 99 | 93 | 126 | 176 | 121 | 220 | 200 |
| | | TD | 141 | 139 | 172 | 168 | 151 | 270 | 160 |
| | | ZD | 17 | 23 | 48 | 70 | 38 | 90 | 75 |
| | | MD/TD | 0.70 | 0.67 | 0.73 | 1.05 | 0.80 | 0.81 | 1.25 |
| | Strength at break [kPa] | MD | 23500 | 26800 | 16600 | 16200 | 26300 | 12900 | 12900 |
| | | TD | 19400 | 14000 | 10200 | 8900 | 19700 | 8980 | 7940 |
| | TD strength at break/MD average cell size [kPa/μm] | | 497 | 311 | 200 | 148 | 493 | 82 | 112 |
| | MD strength at break/TD average cell size [kPa/μm] | | 373 | 506 | 259 | 266 | 405 | 96 | 258 |
| | Interlaminar strength [MPa] | | 3.4 | 4.9 | 4.5 | 6.3 | 7.1 | 4.1 | 6.3 |

TABLE 1-continued

|  |  | Example | | | | | | |
|---|---|---|---|---|---|---|---|---|
|  |  | 1 | 2 | 3 | 4 | 5 | 6 | 7 |
| Ratio [interlaminar strength/thickness] [MPa/mm] | | 56.7 | 61.3 | 30.0 | 35.0 | 50.7 | 21.6 | 21.0 |
| 25% compressive strength [kPa] | | 670.0 | 1160.0 | 830.0 | 1250.0 | 1950.0 | 990.0 | 1330.0 |
| Withstand voltage value [kV/0.7 mm] | MD | 12.0 | 12.0 | 12.0 | 12.0 | 12.0 | 8.4 | 12.0 |
|  | TD | 12.0 | 12.0 | 12.0 | 12.0 | 12.0 | 9.5 | 12.0 |
|  | Determination | 1 | 1 | 1 | 1 | 1 | 2 | 1 |
| Withstand voltage value [kV/1.0 mm] | MD | 12.0 | 12.0 | 12.0 | 12.0 | 12.0 | 12.0 | 12.0 |
|  | TD | 12.0 | 12.0 | 12.0 | 12.0 | 12.0 | 12.0 | 12.0 |
|  | Determination | 1 | 1 | 1 | 1 | 1 | 1 | 1 |

TABLE 2

|  |  |  | Comparative Example | | | | |
|---|---|---|---|---|---|---|---|
|  |  |  | 1 | 2 | 3 | 4 | 5 |
| Composition | | Polyolefin resin A [parts by mass] | 100 | 100 | 100 | 100 | 0 |
|  |  | Polyolefin resin B [parts by mass] | 0 | 0 | 0 | 0 | 70 |
|  |  | Polyolefin resin C [parts by mass] | 0 | 0 | 0 | 0 | 30 |
|  | Additives [parts by mass] | Blowing agent of heat decomposition type | 2.3 | 1.2 | 1.4 | 3.8 | 4.5 |
|  |  | Decomposition temperature reglator | 1 | 1 | 1 | 1 | 1 |
|  |  | Antioxidant | 0.5 | 0.5 | 0.5 | 0.5 | 0.5 |
| Physical properties of foam sheet | | Thickness [mm] | 0.06 | 0.15 | 0.20 | 0.20 | 0.83 |
|  |  | Expansion ratio [cm$^3$/g] | 2.2 | 1.8 | 2.0 | 5.0 | 7.9 |
|  |  | Density [g/cm$^3$] | 0.45 | 0.56 | 0.50 | 0.20 | 0.13 |
|  |  | Degree of crosslinking (gel fraction) [% by mass] | 21.0 | 29.8 | 30.0 | 30.0 | 33.0 |
|  | Average cell size [μm] | MD | 113 | 104 | 133 | 143 | 235 |
|  |  | TD | 124 | 205 | 156 | 173 | 180 |
|  |  | ZD | 26 | 37 | 49 | 42 | 55 |
|  |  | MD/TD | 0.91 | 0.51 | 0.85 | 0.83 | 1.31 |
|  | Maximum cell size [μm] | MD | 267 | 294 | 242 | 373 | 550 |
|  |  | TD | 410 | 400 | 314 | 550 | 460 |
|  |  | ZD | 46 | 91 | 115 | 109 | 120 |
|  |  | MD/TD | 0.65 | 0.74 | 0.77 | 0.68 | 1.20 |
|  | Strength at break [kPa] | MD | 8300 | 12500 | 14800 | 4800 | 3230 |
|  |  | TD | 6700 | 9500 | 9000 | 3600 | 1830 |
|  | TD strength at break/MD average cell size [kPa/μm] | | 59 | 91 | 68 | 25 | 8 |
|  | MD strength at break/TD average cell size [kPa/μm] | | 67 | 61 | 95 | 28 | 18 |
|  | Interlaminar strength [MPa] | | 1.3 | 3.1 | 3.8 | 0.8 | 1.1 |
|  | Ratio [interlaminar strength/thickness] [MPa/mm] | | 21.7 | 20.7 | 19.0 | 4.0 | 1.3 |
|  | 25% compressive strength [kPa] | | 70.0 | 550.0 | 700.0 | 50.0 | 68.0 |
|  | Withstand voltage value [kV/0.7 mm] | MD | 5.0 | 8.0 | 5.7 | 3.8 | 1.9 |
|  |  | TD | 6.9 | 7.0 | 8.4 | 3.5 | 3.2 |
|  |  | Determination | 3 | 3 | 3 | 3 | 3 |
|  | Withstand voltage value [kV/1.0 mm] | MD | 7.3 | 12.0 | 8.2 | 5.5 | 2.5 |
|  |  | TD | 8.1 | 10.0 | 12.0 | 5.0 | 4.7 |
|  |  | Determination | 3 | 1 | 2 | 3 | 3 |

As apparent from the results described above, the present invention can provide a thin polyolefin resin foam sheet which is excellent in impact-absorbing properties and impact resistance and has withstand voltage properties.

The invention claimed is:

1. A polyolefin resin foam sheet having a plurality of cells which is formed by foaming a polyolefin resin,
wherein, in the polyolefin resin foam sheet, the average cell sizes in a machine direction (MD) and a transverse direction (TD) are 150 μm or less, and the maximum cell sizes in the MD direction and the TD direction are 500 μm or less;
a ratio of strength at break in the TD direction to the average cell size in the MD direction, [TD strength at break/MD average cell size], and a ratio of strength at break in the MD direction to the average cell size in the TD direction, [MD strength at break/TD average cell size], are both 80 kPa/μm or more;
wherein the polyolefin resin foam sheet has an expansion ratio of 1.1 to 2.8 cm$^3$/g; and wherein the polyolefin resin foam sheet has a 25% compressive strength of 670 to 2000 kPa.

2. The polyolefin resin foam sheet according to claim 1, wherein a ratio of the average cell size in the MD direction to that in the TD direction, [MD average cell size/TD average cell size], is 0.6 to 1.4.

3. The polyolefin resin foam sheet according to claim 1, having the withstand voltage value of 8 kV/0.7 mm or more.

4. The polyolefin resin foam sheet according to claim 1, having the gel fraction of 5 to 60% by mass.

5. The polyolefin resin foam sheet according to claim 1, having the thickness of 0.02 to 1.9 mm.

6. The polyolefin resin foam sheet according to claim 1, wherein the polyolefin resin is a polyethylene resin.

7. The polyolefin resin foam sheet according to claim 6, wherein the polyethylene resin is polymerized with a metallocene polymerization catalyst.

8. An adhesive tape having a pressure sensitive adhesive layer provided on at least one surface of the polyolefin resin foam sheet according to claim 1.

\* \* \* \* \*